Aug. 20, 1946.  G. C. EHEMANN, JR  2,405,945
BILLET SEVERING APPARATUS
Filed Nov. 20, 1942  7 Sheets-Sheet 3
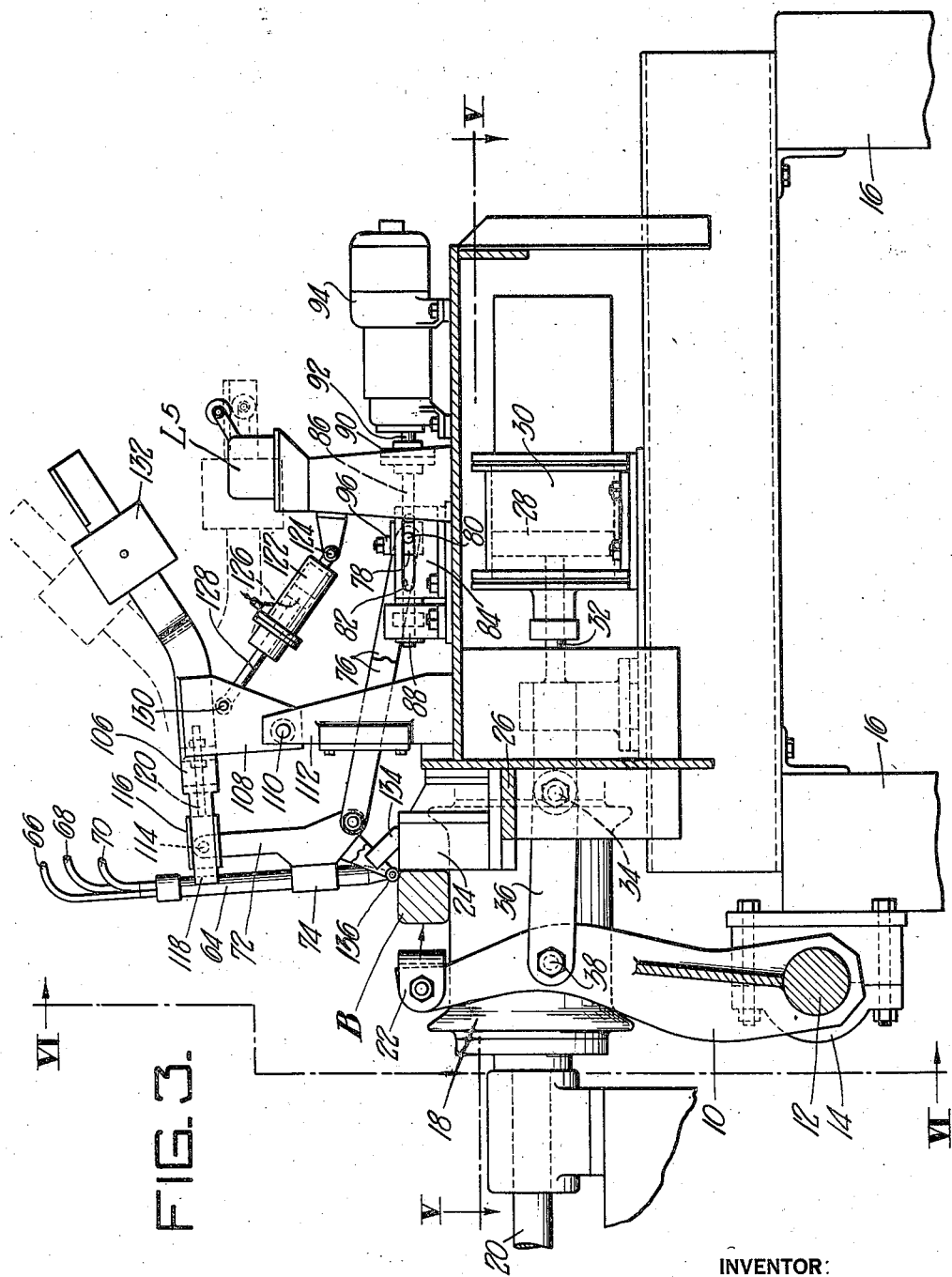
INVENTOR:
GEORGE C. EHEMANN, JR.,
BY John E. Jackson
HIS ATTORNEY.

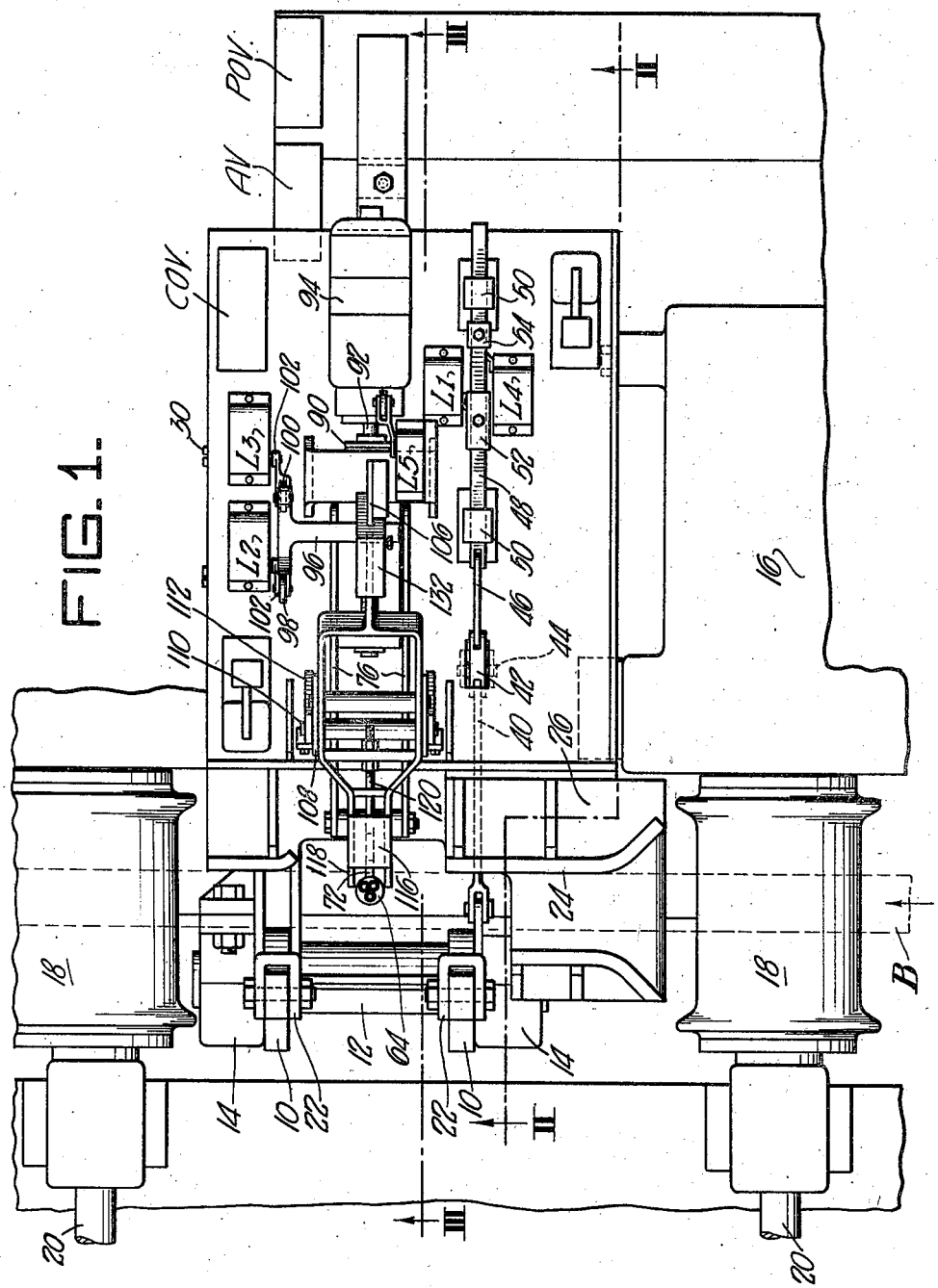

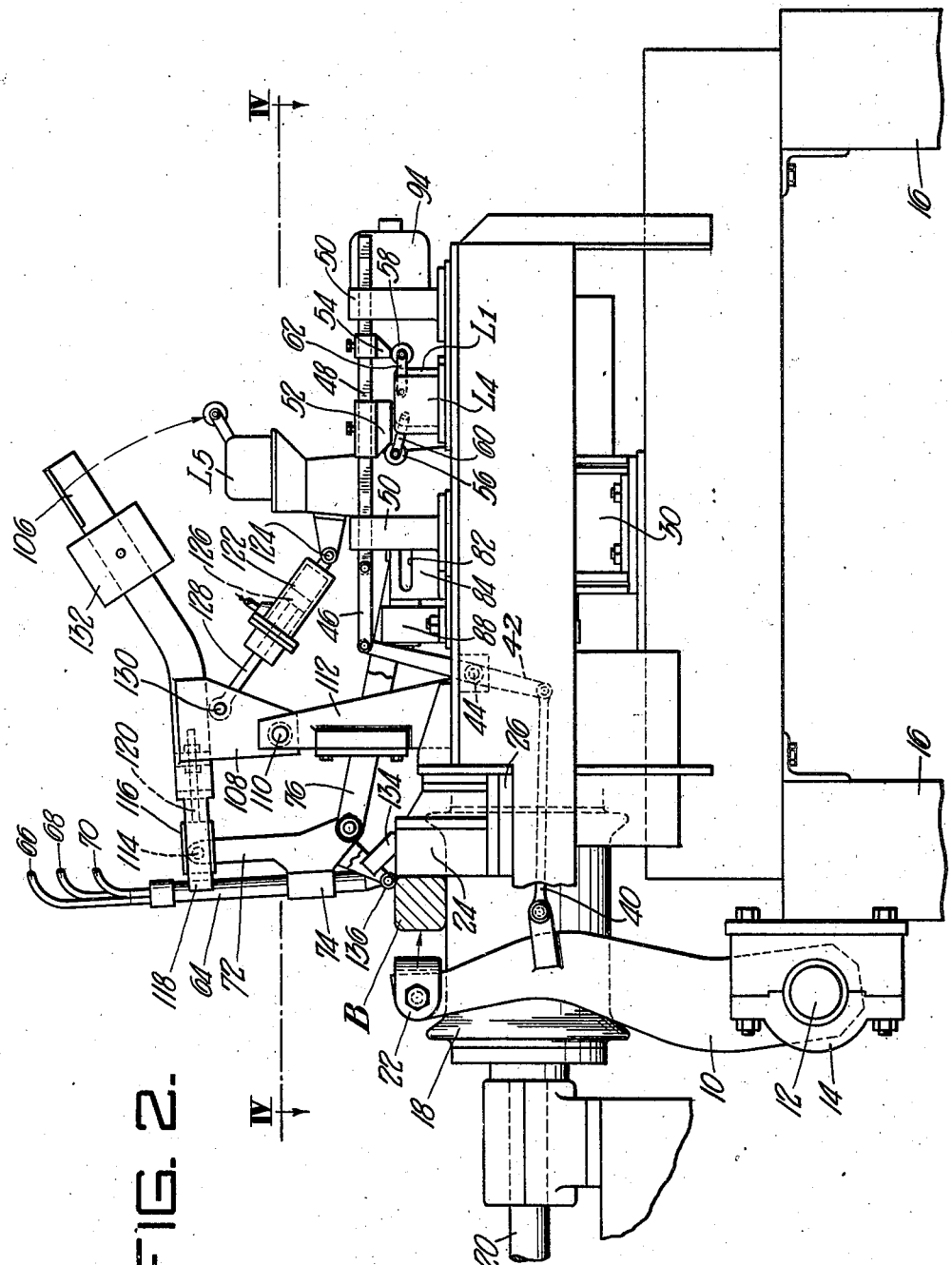

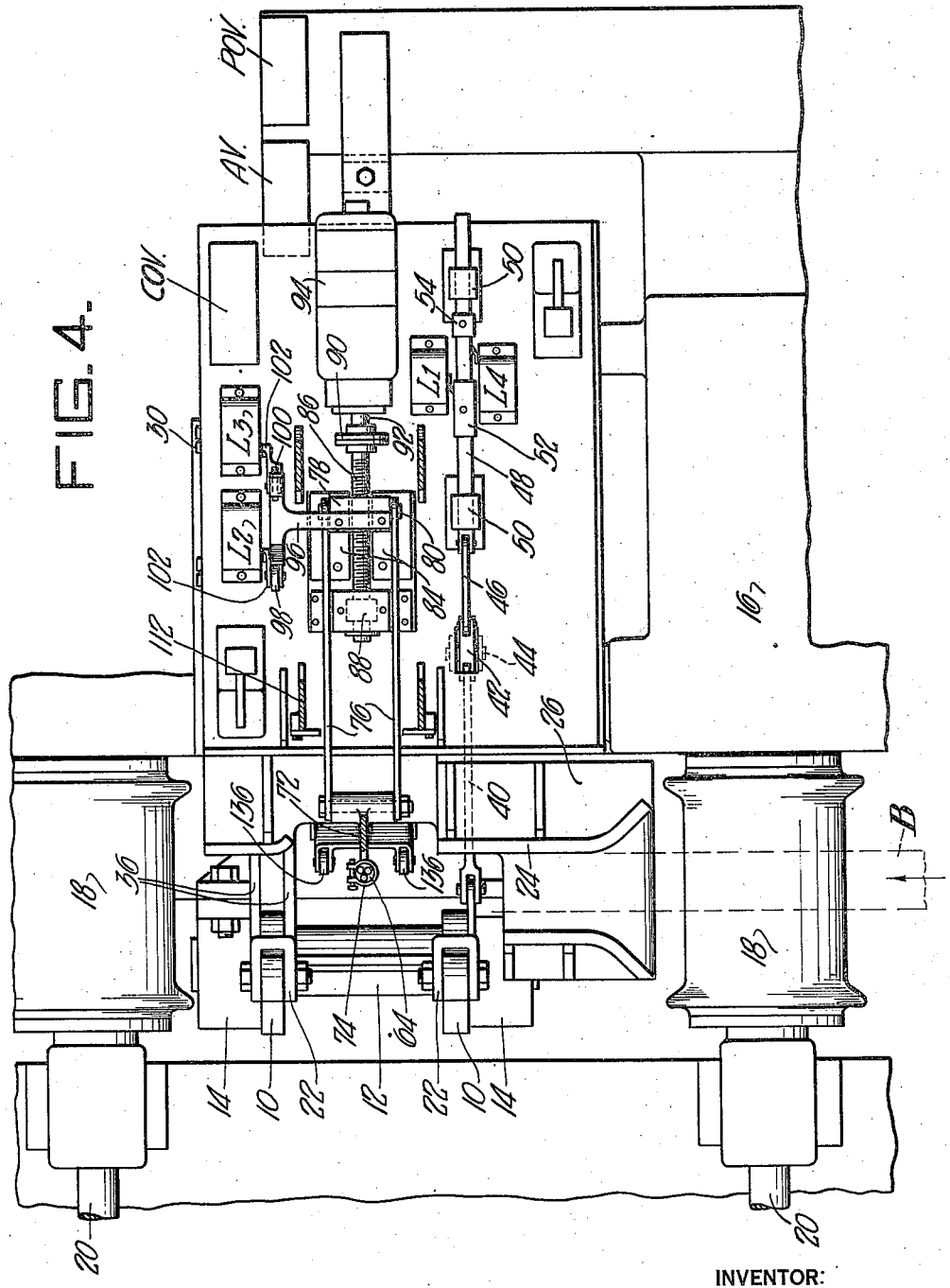

Aug. 20, 1946.　　　G. C. EHEMANN, JR　　　2,405,945
BILLET SEVERING APPARATUS
Filed Nov. 20, 1942　　　7 Sheets-Sheet 5
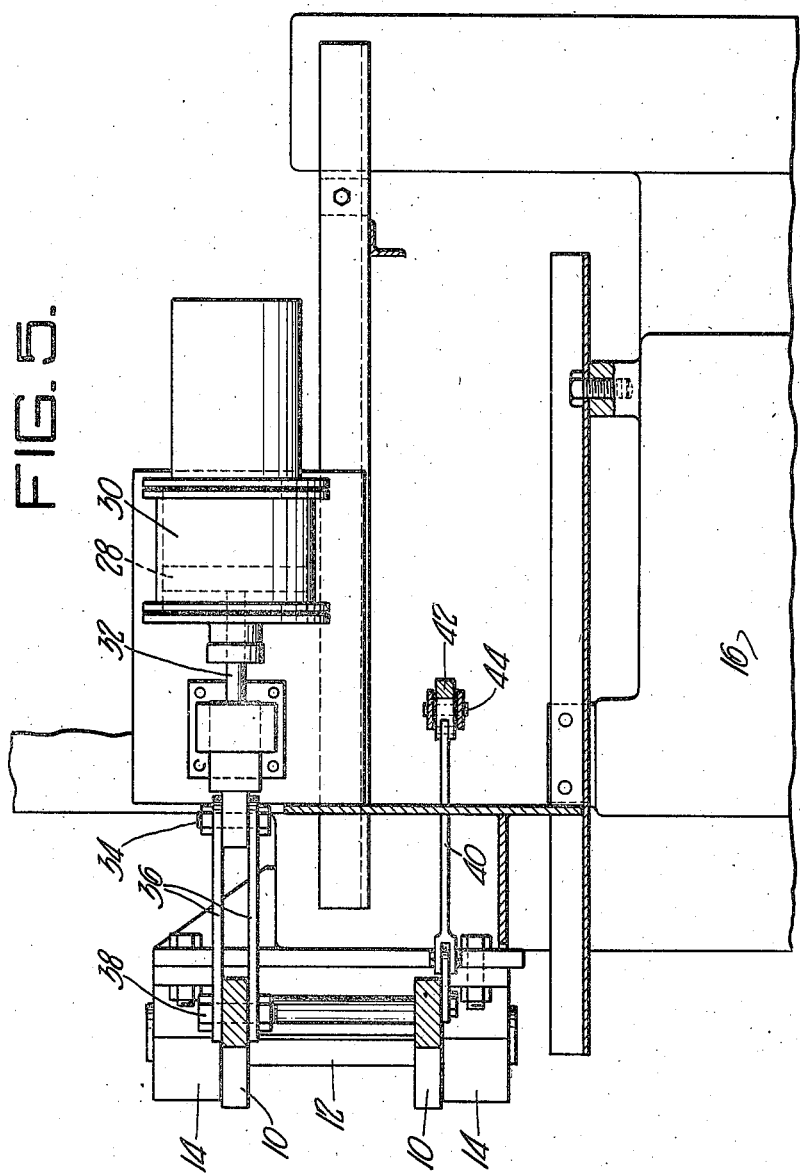
INVENTOR:
GEORGE C. EHEMANN, JR.,
BY John E. Jackson
HIS ATTORNEY.

Aug. 20, 1946.   G. C. EHEMANN, JR   2,405,945
BILLET SEVERING APPARATUS
Filed Nov. 20, 1942   7 Sheets-Sheet 6
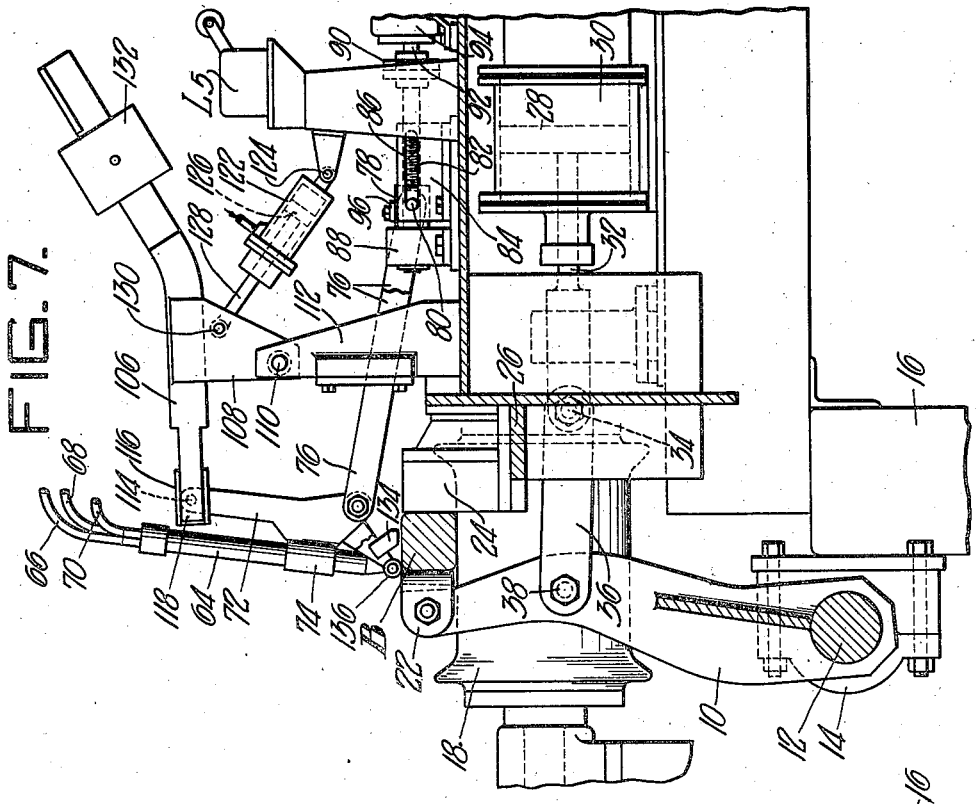
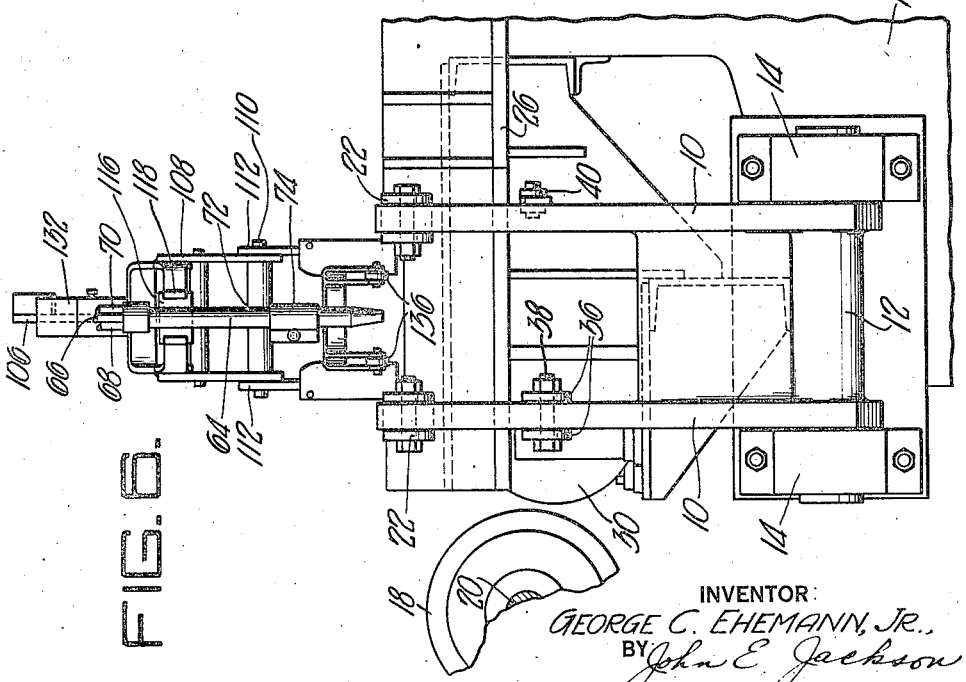
INVENTOR:
GEORGE C. EHEMANN, JR.,
BY John E. Jackson
HIS ATTORNEY.

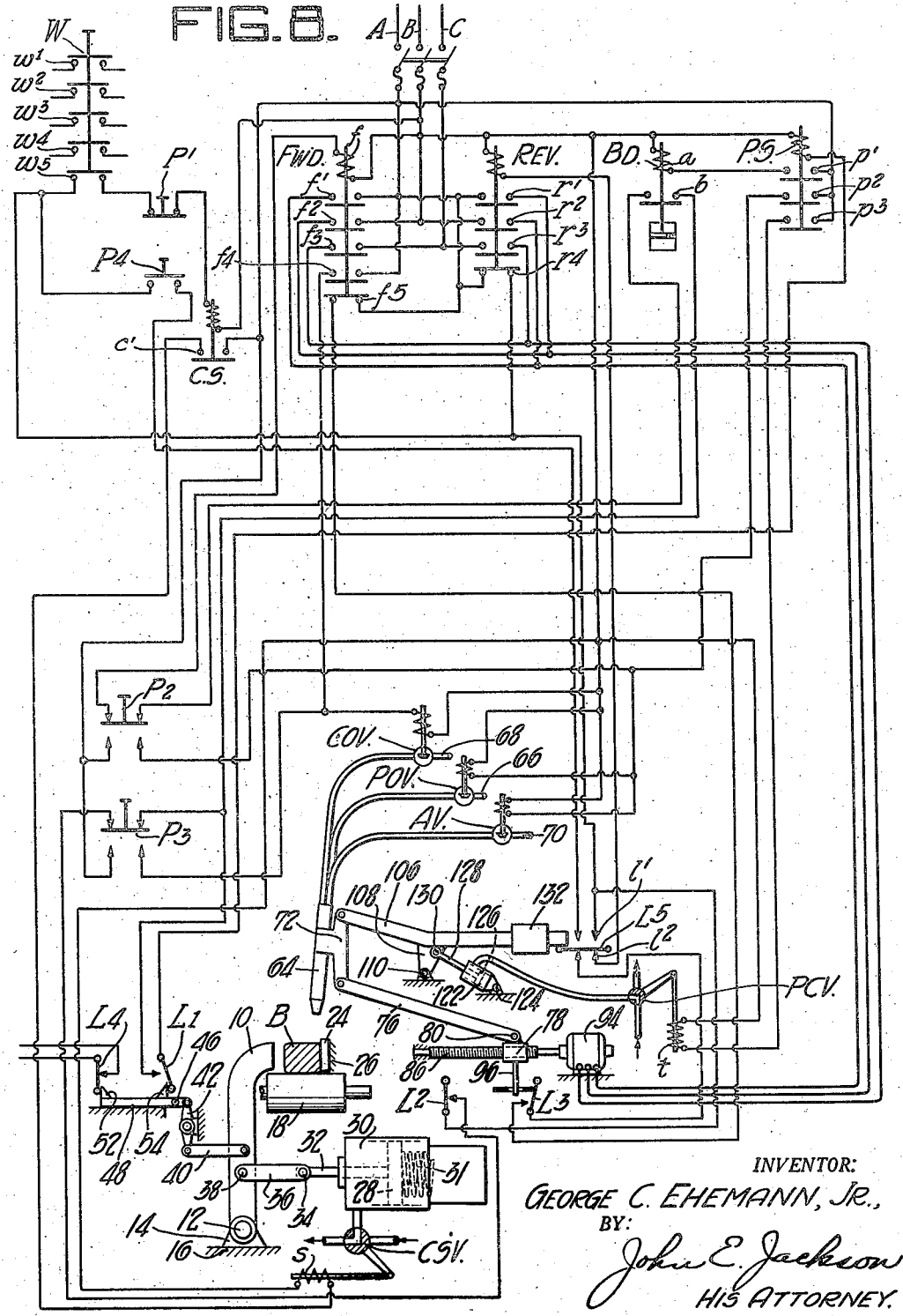

Patented Aug. 20, 1946

2,405,945

UNITED STATES PATENT OFFICE 2,405,945

BILLET SEVERING APPARATUS

George C. Ehemann, Jr., Edgewood, Pa., assignor to Carnegie-Illinois Steel Corporation, a corporation of New Jersey Application November 20, 1942, Serial No. 466,388

10 Claims. (Cl. 266—23)

The present invention relates to means for flame cutting a billet into predetermined sections under control of the operator from a central station while the billet is moving intermittently along a production line, the apparatus providing means for severing the billet in such a manner that the ends will not be distorted. Prior to the present invention, steel bars or billets coming from the mill rolls which reduce their area of section have been cut into one or more pieces for further processing or for shipment. Under the prior practice the severing has generally been done either by hot or cold shears or saws.

An inherent objection to hot or cold shearing and sawing as heretofore practiced is that the bar or billet is frequently crushed and distorted near the cut, and the bottom is burred or bent in a manner which interferes with subsequent processing and which is frequently objected to by those receiving severed billets or bars. Although sawing overcomes some of the objectionable crushing and distortion in the region of severing, the sawing operation is slow, the equipment is costly, and its maintenance cost is exceedingly high.

It is broadly old to sever various metal products by the use of oxyacetylene or other cutting torches. However, there are problems involved in the efficient cutting or severing of bars or billets by such torches. One problem concerns the holding of the work to be cut and the proper traversing of the torch in a controlled manner transversely of the work. Another problem is to properly control the travel of the cutting torch in an accurate manner. Other problems relate to the nicety of control of respective supplies of acetylene and oxygen supplied to the cutting torch in such a way that the billet can first be preheated in the zone where cleavage is to be effected and subsequently severed by varying the supplies of oxygen and acetylene.

The present invention solves the above problems and in addition provides novel control means operable from a point remote to the region where the cutting is effected, the arrangement being such that a single operator located in a pulpit in the region above the path of travel of an advancing billet can control the travel of the billet along the roller table of the production line and cause it to come to rest in a predetermined position abreast of one or more flame cutters, whereupon the bar or billet can be clamped and held stationary under control of the operator and one or more of the flame cutters caused to move transversely of the billet so as to flame cut the same into one or more sections of desired length, the flame cutting producing a clean line of cleavage devoid of burr, flash or distorted ends.

The above and other features of the invention will be fully apparent from the following detailed disclosure and claims, when read in connection with the accompanying drawings.

Figure 1 is a top plan illustrating the clamping means and torch moving means of the present invention.

Figure 2 is a sectional elevation on line II—II of Figure 1.

Figure 3 is a sectional elevation on line III—III of Figure 1.

Figure 4 is a longitudinal sectional plan taken on line IV—IV of Figure 2.

Figure 5 is a sectional plan taken on line V—V of Figure 3.

Figure 6 is an elevation taken on line VI—VI of Figure 3.

Figure 7 is a vertical section showing the positions of the parts after the billet has been clamped and after the torch traversing mechanism has been actuated to cause it to move transversely of the billet a sufficient distance to sever the same.

Figure 8 is a diagrammatic view illustrating various limit switches and electrically operated valves and the circuits thereof, the view being of a schematic nature to show the coordination between the billet clamping and severing devices and the means for controlling the operation thereof, as well as for controlling the supply of acetylene gas and preheating and cutting oxygen to the severing torches.

The chief components of the apparatus are a billet clamp, means for actuating it pneumatically under control of an electrically operated valve, and an oxyacetylene cutting torch which is movably supported in such a way that it can be moved transversely of the bar or billet to be cut and also moved up and down in a vertical plane, these movements being effected by the joint action of a pneumatic cylinder and an electric motor both under control of electrical devices hereinafter more fully described.

Referring in detail to the drawings, 10—10 represent clamp lever arms carried by a shaft 12 journaled in bearings 14 secured to a movable frame structure 16 which is integrated with the usual roller runout table of a rolling mill. Such a runout table includes a plurality of billet supporting rollers 18 carried by conventional power driven shafts 20.

The bar or billet B to be severed is advanced longitudinally along the runout table by a suitable motor drive operatively connected to the shaft 20 and under the control of an operator. The roller table control is so arranged that when the motor drive therefor is energized the rolls 18 will advance the billet longitudinally, and when the billet reaches the position where it is to be severed, the motor drive may be interrupted by the operator. The operator will then operate certain control buttons hereinafter referred to so as to cause clamp levers 10 to rock about the axis of the shaft 12 to thus move the clamp jaw 22 from the position of Figures 2 and 3 to the position of Figure 7. Thus the billet will be firmly held in engagement with a fixed jaw 24 which is secured in a suitable manner to a support 26 forming part of the fixed structure of the machine.

The clamp arms 10 are pneumatically actuated by a piston 28 operating within a cylinder 30, the piston having a rod 32 which is connected by a bolt 34 with link 36 connected by a bolt 38 passing through the clamp arms 10. A spring 31 bears on the piston 28 and tends to move the clamp arms 10 to release position. Thus it will be understood that air supplied to or exhausted from the clamp cylinder 30 can control the movement of the clamping jaw 22 to and from clamping position.

Means are provided whereby movement of the clamp arm 10 is caused to actuate limit switches L1 and L4. To this end a link 40 pivotally connects the arm 10 with a lever 42 which is pivoted at 44 (Figure 2). Lever 42 is adapted to transmit reciprocating motion through link 46 to a rod 48 slidably mounted in guides 50. This rod carries cams 52 and 54 which coact respectively with rollers 56 and 58 secured to the outer ends of arms 60 and 62 of the respective limit switches L1 and L4. Limit switch L1 when at rest is normally open, and is closed at the end of the clamp cylinder stroke.

Limit switch L4 is opened when the clamp arm starts its clamping movement, and serves to open the circuit of the roller table drive motor and thus stop the travel of billets along the table. The flame cutting torch for severing the billet includes a blow pipe 64 adapted to be supplied with oxygen for preheating through pipe 66. A pipe 68 supplies the oxygen for cutting. The acetylene gas supply is conveyed to the torch through pipe 70. The flow of oxygen to the torch for preheating is under control of an electrically operated solenoid valve POV in pipe 66. The flow of oxygen to the torch for flame cutting is under control of an electrically operated solenoid valve COV. The control of flow of acetylene gas to the torch for flame cutting is under control of an electrically operated solenoid valve AV.

The flame cutting torch is movably supported on a holder 72 having a hub portion 74, which surrounds the blow pipe 64. The holder is connected by links 76 with a cross head 78 by means of a wrist pin 80. The wrist pin extends through and is guided by slots 82 formed in guides 84. The cross head is reciprocated by a feed screw 86 which is threaded through a feed-nut secured to the cross head. The screw is provided at one end with a collar mounted in a suitable thrust bearing 88 to restrain it against lateral or longitudinal motion, the opposite end of the screw being connected by a shaft coupling 90 with the armature shaft 92 of a reversible electric motor 94 whose circuit is controlled, by means to be hereinafter described, in such a way that when the motor is first energized the movable support for the torch will be swung in a forward direction transverse to the longitudinal axis of the rod or billet. When the motor is reversed, as later described, the torch will be retracted to starting position. The cross head carries an arm 96 having cams which coact with rollers 98 and 100 secured to arms 102 of respective limit switches L2 and L3. The switch L2 is normally closed when at rest, and opens when the torch has completed its forward stroke in severing the billet B.

The switch L3 is normally open at rest, closes when the torch moves forward at the start of the flame severing operation, and is again opened when the torch is retracted to starting position. This stops the motor 94 when the torch reaches its fully retracted position.

A limit switch L5 is arranged to be actuated by the vertical movement of the torch tilting lever 106. This switch L5 has one pair of contacts $l^1$ normally open and another pair of contacts $l^2$ normally closed when at rest. The open contacts $l^1$ are closed when the torch lever 106 is lowered to position to flame cut the billet, and the closed pair of contacts $l^2$ are opened by said lever as it lowers the torch.

The torch lever 106 has a downwardly extended arm 108, which is pivoted at 110 to a fixed bracket 112. The torch support 72 above referred to is pivotally suspended from a pin 114 secured to a head 116 which is adjustably mounted on a guide 118 formed on the forward extremity of the tilting lever 106. Extending rearwardly from the head 116 there is a threaded rod 120 carrying suitable nuts by means of which the position of the head can be adjusted along the lever.

An air cylinder 122 is pivotally supported at 124 on a fixed bracket, as shown. Operating within this cylinder there is a piston 126, whose rod 128 is pivotally connected at 130 to the arm 108 of the tilting lever 106. A counterweight 132 adjustably mounted on the tilting lever is provided to approximately counterbalance the weight of the cutting torch. A stop 134 secured to the lower end of the torch holder serves to limit the tilting movement of the holder which is provided at its lower extremity with a billet engaging roller 136 adapted to ride over the upper face of the billet while the flame cutting torch is traversing the same. The connections described are adapted to move the torch vertically through a distance of about eight inches or from the cutting position of Figures 2, 3, and 7 to the elevated noncutting position of Figure 8. The motor 94 and screw 86 effect the transverse movements of the torch as above described.

The mechanism described in detail is coordinated with an electric control system in such a way that when a billet arrives at the point where it is adapted to be severed into sections, the operator closes a control circuit. Thereafter the cycle is automatic, air being supplied to the cylinder 30 so as to thus cause the clamping jaw 22 to move to the position of Figure 7 and thus hold the billet firmly in position. The parts are so coordinated and arranged that once the operation is started, the torch will be automatically lowered to proper working position and then will move transversely across the billet a sufficient distance to flame cut the same and thus effect a clean cleavage devoid of burrs or distortions. Then the torch will be returned to starting position and all parts automatically reset in position to be in readiness to repeat the cycle.

Before describing the operation, the functions of the chief elements of the electrical equipment shown in Figure 8 will be briefly referred to.

At the beginning of the operating cycle, the limit switches L1, L2, L3, L4 and L5 are in the normal rest positions hereinbefore described. These positions at the start of the cycle are indicated in Figure 8, to which figure reference should be made in considering the operation and coordination of the mechanical and electrical devices.

W is a manually operated main control switch of the gang type, having five pairs of contacts $w^1$, $w^2$, $w^3$, $w^4$, and $w^5$. Each pair of contacts is adapted to control a given flame cutting unit involving all the equipment shown in Figure 8. For the purpose of simplicity, only one flame cutting unit is illustrated, this unit being connected with the pair of contacts $w^5$. Each of the other four pairs of contacts $w^1$ through $w^4$ will be connected with equipment identical with the unit shown in Figure 8.

P1 represents a push button switch which is normally closed but which may be opened manually to lock out any given one of the five units assumed to be connected with the contacts of the gang switch W.

P2 and P3 are push button switches which are normally closed but which when operated will close respective circuits to the preheating valve POV and the cutting oxygen valve COV for the purpose of testing the operation of the same. P4 is a push button switch which is normally open but which when closed will energize the operating coil of relay CS, whose function is later referred to, the purpose of switch P4 being to permit the operator to operate any of the five flame cutting units while the main gang switch W still remains open. When energized, the relay CS closes a circuit across a pair of contacts through the operating coil of solenoid valve CSV, which controls the supply of air to the clamp cylinder 30.

The forward motion relay FWD includes five pairs of contacts for controlling five circuits hereinafter more fully pointed out, it being here noted that the four pairs of contacts $f^1$, $f^2$, $f^3$, and $f^4$ shown in open circuit position are closed upon forward movement of the flame cutting blow pipe, and the fifth or bottommost pair of contacts $f^5$ are opened during such forward movement. The direction of rotation of the motor 94 is controlled by the operation of the forward motion relay FWD and the reverse relay REV. The energization of the actuating coils of the relay FWD is effected in a manner which will later be made apparent under the heading of "Operation."

A reverse contact relay REV controls four circuits through four respective pairs of contacts $r^1$, $r^2$, $r^3$, and $r^4$, three of these circuits being normally open at the start of the cycle, and the fourth circuit being closed across contacts $r^4$, as shown. The energization of the actuating coil of relay REV is controlled in a manner later set forth.

A time delay relay BD is provided which includes a pair of contacts $b$ which are normally open at the start of the operating cycle. When the operating coil of this relay is energized, a predetermined interval of time elapses before the circuit across its contacts $b^1$ is made, the relay including a piston working in a dash-pot, as diagrammatically suggested in Figure 8, or other conventional time delay device.

The relay PS includes three pairs of contacts $p^1$, $p^2$, and $p^3$, controlling respective circuits as shown.

The valve COV includes an actuating coil controlling the supply of cutting oxygen by way of pipe 68 to the blow pipe 64. The operating coil of this valve COV is energized in a manner to be later described.

The valve POV controls the supply of preheating oxygen to the blow pipe 64 by way of pipe 66. The operating coil of this valve POV is controlled in a manner to be later described.

The valve AV controls the supply of acetylene gas to the blow pipe 64 by way of pipe 70. The operating coil of this valve AV is energized in a manner to be later described. The valve PCV controls the supply of air to the positioning cylinder 122, whereby the vertical position of the blow pipe is varied. This positioning cylinder valve PCV includes an operating coil $t$, which is energized in a manner later described.

The clamp cylinder solenoid valve CSV controls the admission of air to the cylinder 30 for operating the billet clamp. This valve CSV includes an operating coil $s$ connected in circuits as shown, which circuits are controlled in a manner hereinafter described. The direction of rotation of the motor 94 is controlled by the forward and reverse relays FWD and REV through the circuit connections shown and hereinafter more fully referred to.

*Operation*

In order to start the apparatus, the operator actuates the main control switch W. When the switch W is closed, a circuit is completed through two of the main power supply lines ABC and the actuating coil of relay CS.

Energization of the coil of relay CS closes a circuit across the contacts $c^1$ thereof through the operating coil $s$ of solenoid valve CSV which causes the admission of air to the clamp cylinder 30, thus forcing clamp jaw 22 into position to grip the billet B. Movement of the jaw lever 10 through link 40 and arm 42 opens limit switch L4 and closes limit switch L1, thus through the circuit connections shown energizing relay PS. Energization of this relay PS closes a circuit across the bottom set of contacts $p^3$ thereof, and through the operating coil $t$ of the valve PCV, thus exhausting air from the positioning cylinder 122 and lowering the torch 64 into cutting position in close proximity to the billet B. Energization of the operating coil of relay PS also closes respective circuits across the center pair of contacts $p^2$ through the operating coils of the solenoid valves POV and AV, thus supplying preheating oxygen and acetylene gas respectively to the torch via pipes 66 and 70.

Energization of the operating coil of relay PS also closes the circuit across the contacts $p^1$ through the operating coil $a$ of a time delay relay BD which, after a predetermined time interval, closes a circuit across the contacts $b$ of said relay BD through the operating coil $f$ of the forward relay FWD. This relay FWD is effective to close a circuit through the blow pipe actuating motor 94. The actuation of the relay FWD closes a circuit across the contacts $f^4$. This establishes a circuit through the operating coil of the solenoid valve COV, thus opening the valve and admitting cutting oxygen to the torch 64 via pipe 68.

At the end of the severing movement of the torch, the cam member 96 will have been moved by the motor driven screw 86 to a position to open the limit switch L2. This will open the circuit shown and cause the deenergization of relays PS and FWD. The opening of relay FWD stops the motor 94 and deenergizes the operating coil of valve COV by opening the circuit across contacts $f^4$, thereby closing the valve and cutting off the supply of cutting oxygen. The relay PS in the deenergized position opens the circuit across contacts $p^1$, thus deenergizing the operating coil of valve POV. Thus the supply of preheating oxygen is shut off. At the same time that relay PS is deenergized, it opens a circuit across contacts $p^2$, thus deenergizing the operating coil of the valve AV and shutting off the acetylene gas.

Opening the relay PS across contacts $p^3$ deenergizes the operating coil of valve PCV and permits a spring connected to the arm of the valve to move said valve to a position effective to admit air to the cylinder 122, whereupon the piston 126 assisted by the counterweight 132 will elevate the torch to non-cutting position. As the torch reaches the limit of its elevating movement, the end of arm 106 will actuate the limit switch L5, closing the contacts $l^2$ thereof and opening the contacts $l^1$, thus resetting the switch to the starting position of Figure 8.

When the operating coil of the relay FWD is deenergized, a circuit is closed across the contacts $f^5$ thereof, which is effective to energize the operating coil of relay REV. This establishes a circuit across the contacts $r^1$, $r^2$, and $r^3$ from power lines ABC through the motor 94, thus reversing the direction of rotation of the motor and starting the torch movement in a direction to retract it toward starting position. Energization of the operating coil of the reverse relay REV opens the circuit across the contacts $r^4$. This is effective to deenergize the operating coil of relay CS. Upon deenergization of this relay CS, the circuit is broken across the contacts $c^1$ thereof. This causes deenergization of the operating coils of solenoid valve CSV and a spring operating on the arm of the valve moves the valve to a position where the air is vented from cylinder 30, whereupon the spring 31 acting on the piston 28 moves the clamp lever 10 to a position where its grip on the billet is released. When the clamp lever 10 reaches its full retracted position, the motor 94 through screw 86 will have retracted the cross head 78 to a position where the member 96 carried by the cross head will engage and open the limit switch L3. Thus the motor 94 will be stopped automatically when the torch reaches its retracted and elevated starting position. This completes the operating cycle, and thus the several component and coordinated operating elements have been restored to their respective starting positions in readiness for a repetition of the above described cycle.

Although I have described with great particularity a preferred embodiment of the invention which an actual reduction to practice has demonstrated to have great utility and advantage, it is not to be construed that I am strictly limited thereto, since various changes in arrangement and design and substitutions of mechanical and electrical equivalents of the instrumentalities shown and described may be made by those skilled in the art without departure from the invention as defined in the appended claims.

I claim:

1. In an apparatus for flame severing billets and the like, a clamp adapted to grip a billet, an electrically controlled clamp actuating element, a flame cutting torch, respective electrically actuated valves controlling the supplies of preheating oxygen, cutting oxygen and acetylene gas to said torch, movable means for supporting the torch above the billet to be severed, means for lifting and lowering said supporting means, means for moving said supporting means transversely of a billet gripped by said clamp, means automatically opening and closing each of said valves, said clamp actuating element being effective to cause said clamp to grip and hold the billet stationary while said torch is moving transversely thereof to sever the same, and means responsive to movement of the torch supporting means for automatically causing the clamp to release its grip on the billet upon retraction of the torch to starting position.

2. In an apparatus for flame severing billets and similar workpieces, a clamp adapted to grip the workpiece, power means for actuating said clamp, a flame cutting torch, a movable support therefor, means for causing said support to move the torch toward and from the workpiece, means for causing the torch to move transversely of the workpiece first in one direction while severing the work and later in the opposite direction after the severing has been effected, respective pipes for conveying preheating oxygen, cutting oxygen and gas to said torch, respective valves controlling the flow of oxygen and gas through said pipes, respective means for automatically opening and closing said valves at predetermined times, and means whose operation is coordinated with the movements of the torch support for automatically causing the said clamp actuating power means to release the grip of the clamp on the work after the work has been severed by said torch.

3. In an apparatus for flame severing billets and similar workpieces, a clamp adapted to grip the workpiece, a fluid pressure actuated device for operating said clamp, means automatically controlling the admission of fluid pressure to said device and the exhaust of fluid pressure therefrom, a flame cutting torch, a pivoted member from which the torch is pivotally supported, a fluid pressure positioning cylinder housing a piston operatively connected with said member and tending to elevate the torch to non-cutting position, the weight of the torch and member tending to rock them toward cutting position, a valve controlling the admission of fluid pressure to said positioning cylinder and the exhaust of pressure therefrom, and means for controlling the operation of said valve including a device responsive to movement of said clamp.

4. In an apparatus for flame severing billets and similar workpieces, a clamp adapted to grip the workpiece, a fluid pressure actuated device for operating said clamp, an electromagnetic valve for automatically controlling the admission of fluid pressure to said device and the exhaust of fluid pressure therefrom, a flame cutting torch, a pivotally mounted arm from which the torch is pivotally supported, a fluid pressure positioning cylinder housing a piston operatively connected with said arm and tending to elevate the torch to non-cutting position, the weight of the torch and arm tending to rock them toward cutting position, an electromagnetic valve controlling the admission of fluid pressure to said positioning cylinder and the exhaust of pressure therefrom, means controlling the operation of said electromagnetic valve including a circuit closing device responsive to movement of said clamp, an electric motor having a driving connection with the torch for moving it transversely of the billet in opposite directions, and means for automatically reversing the direction of rotation of said motor.

5. In a flame severing apparatus of the character described, a flame cutting torch, a pivotally mounted lever, a torch supporting member hingedly hung from said lever and having a bearing roller adapted to travel on the upper face of the workpiece to be cut, a cylinder having a fluid pressure operated piston therein connected with said lever effective to rock said lever to elevate the torch, a motor driven screw and operating connections for transmitting movement to said supporting member effective to shift the torch support across the workpiece to be severed, and means for automatically reversing the direction of rotation of said screw upon completion of the flame cutting movement of the torch.

6. In an apparatus for flame severing billets and the like, a pivoted clamp member, a cylinder having a piston therein operatively connected with said clamp member, an electrically actuated valve controlling the supply of fluid to said cylinder and the exhaust therefrom, a flame cutting torch adapted to sever a billet gripped by said clamp member, a pivotally mounted lever from which the torch is hingedly suspended, power means controlling the elevation of said torch with relation to the billet to be severed, means for automatically controlling said power means, a reversible power device operatively connected with said torch for moving it in opposite directions transversely of the billet held by said clamp member, means automatically controlling the operation of said reversible power device, and means responsive to movement of the torch to a predetermined position for automatically controlling the operation of said electrically actuated valve.

7. In an apparatus for flame severing billets and the like, a clamp member, a cylinder having a piston therein operatively connected with said clamp member, an electrically actuated valve controlling the supply of fluid to said cylinder and the exhaust therefrom, a flame cutting torch adapted to sever a billet gripped by said clamp member, a movably mounted member from which the torch is hingedly suspended, power means coacting with said member and controlling the elevation of said torch with relation to the billet to be severed, means for automatically controlling said power means, an electric motor, a motion transmission connection between the torch and the motor whereby the torch is moved transversely of a billet held by said clamp member, means automatically controlling the direction of rotation of said motor, and means responsive to movement of the torch to a predetermined position for automatically controlling the operation of said electrically actuated valve.

8. In an apparatus for flame severing billets and similar workpieces: a clamp adapted to grip the workpiece; power means for actuating said clamp; means automatically controlling the operation of said power means; a flame cutting torch; a movable support therefor, a tilting member to which said support is pivotally secured; power means for controlling the tilting of said member; means responsive to the movement of said clamp for causing the power means to effect the shifting of the tilting member to thus bring the torch to cutting position; respective pipes for supplying preheating oxygen, cutting oxygen and gas to said torch; respective valves in said pipes controlling the flow of oxygen and gas to the torch; a time delay control device; means for automatically opening the respective valves in the preheating oxygen supply and gas supply pipes and initiating the operation of said time delay control device; a forward motion control switch; a reverse motion control switch; a motor whose operation and direction of rotation is determined by the said two switches; feed means driven by said motor for advancing and retracting said torch support transversely of the workpiece; a switch and respective devices controlled thereby adapted to be actuated at the end of the forward movement of said feed means effective to throw out said forward motion control switch, stop the forward travel of said motor and said feed means, shut off said gas supply valve and actuate a valve controlling the power member to cause the power member to lift the tilting member and torch carried thereby; a switch responsive to movement of said tilting member, and means controlled by the last named switch effective to release the said clamp actuating power means thus freeing the work from the grip of the clamp; other means controlled by the last named switch effective to actuate said reverse switch, and thus reverse said motor and retract said feed means; a limit switch arranged to be operated at the end of the retractive movement of said feed means; and means controlled by said limit switch for stopping the reverse motion of said motor, thus stopping the feed means at a predetermined starting position.

9. In combination, a power actuated work clamp, torch positioning and actuating means, and circuit closing devices responsive to movement of said work clamp to control said torch positioning and actuating means.

10. In combination, a power actuated work clamp, torch positioning and actuating means, and circuit closing devices responsive to movement of the torch positioning means for automatically releasing the clamp from the work when said torch positioning means arrives at its retracted starting position.

GEORGE C. EHEMANN, Jr.